W. S. JACOBSON.
BERRY PAIL.
APPLICATION FILED OCT. 11, 1918.
1,307,256.
Patented June 17, 1919.
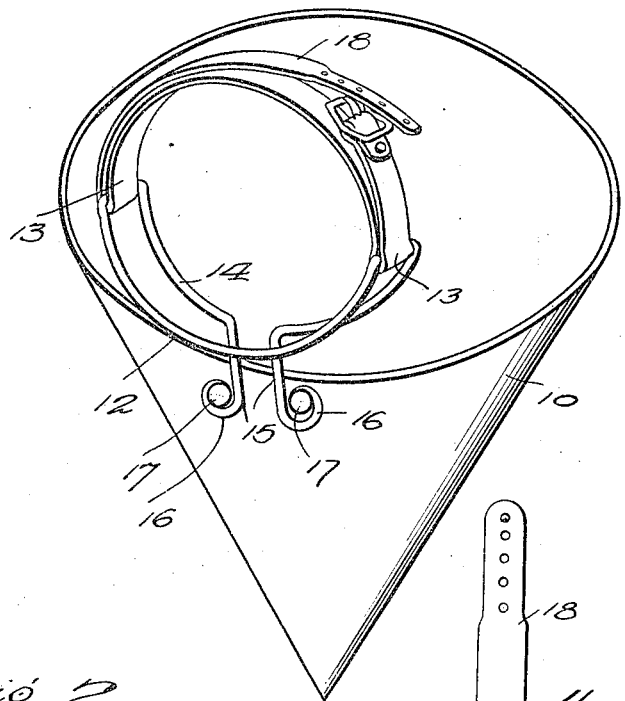
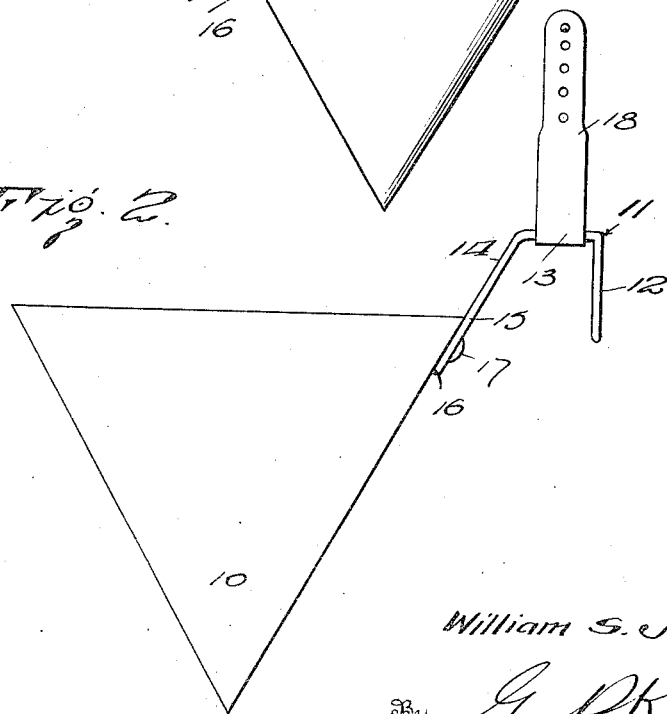
William S. Jacobson
Inventor
By Geo. P. Kimmel
Attorney

UNITED STATES PATENT OFFICE.

WILLIAM S. JACOBSON, OF STEEL HEAD, BRITISH COLUMBIA, CANADA.

BERRY-PAIL.

1,307,256.  Specification of Letters Patent.  Patented June 17, 1919.

Application filed October 11, 1918. Serial No. 257,813.

*To all whom it may concern:*

Be it known that I, WILLIAM S. JACOBSON, a citizen of the United States, residing at Steel Head, in the Province of British Columbia, Canada, have invented certain new and useful Improvements in Berry-Pails, of which the following is a specification.

This invention relates to an improved berry pail or pail for picking fruit, the object thereof being to provide a simple and novel device of this character adapted to be attached to the wrist of the hand that is used for picking, so as to readily receive the berries as the latter are picked and thereby prevent the same from being mutilated or from dropping on the ground or being otherwise injured or bruised.

A further object of the invention is to provide an improved berry pail consisting of a receptacle preferably in the form of a funnel or conical receptacle having a handle provided with means for connecting the same to the wrist of the operator, the device being of simple construction and capable of being quickly applied and removed.

With the above objects and others in view as will appear as the description proceeds, the invention comprises the novel features of construction, combination of elements and arrangement of parts which will be more fully described in the following specification and then set forth with particularity in the clauses of the claim appended hereto and which forms an essential part of this application.

Reference is had to the accompanying drawings forming a part of this application, wherein like reference characters will refer to similar parts throughout the several views, in which—

Figure 1 is a perspective view of my improved berry pail, and

Fig. 2 is a side elevation thereof.

Referring to the drawings in detail, my improved berry pail or pail for picking fruit, of various sorts, consists of a conical body or receptacle 10, provided at one side with a handle 11. This handle is preferably constructed of a section of metal or wire bent intermediately of its ends, to provide a depending semi-circular loop 12 rebent at right angles to provide end portions 13, the remaining portions extending downwardly parallel to the arc of the portion 12 as shown at 14 and having spaced parallel shank portions 15 vertically disposed and provided with eyes 16 at the extremities thereof for securing the same to the pail or body 10, as shown at 17. In this manner, the attaching part will be disposed above the top edge of the pail, so as to receive and partly encircle the wrist of the wearer, after which the device is secured in position by an adjustable strap 18 engaged with the end or bight portions 13 as shown. The shank portions 15 extend downwardly at an angle corresponding to the angle of the wall of the pail or receptacle 10, while the portion 12 depends at right angles to the horizontal portions 13, thus providing an effectual brace for the device when attached.

The device may be said to consist of a pail with a handle attached or formed integral therewith and adapted to be strapped to the hand which is used for picking. In this manner, the berries can be dropped by the hand as they are picked, whence they will drop directly into the pail and greatly facilitate the picking of berries where it is necessary to reach for the berries, and pick one or two at a time and where it has been usual to pick a berry and then drop the same into a pail and reach for another. The facility of having the device shaped like a funnel, is the facility in emptying the same while attached to the hand and the handle construction permits the device to be firmly secured in position, thereby preventing spilling of the berries. The other hand is also free for whatever use desired, and no time will be lost in transferring the berries from the vines to the pail as quite a load can be picked at a time, and the berries can be dropped the instant they are pulled loose in view of the fact that the mouth of the pail is about an inch from the hand at all times, thereby permitting the berries to be picked with greater facility. The pail can be made out of tin, water-proof cardboard or screen or any light material desired, as will be readily understood.

From the foregoing description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus described my invention, what I claim as new, and desire to secure by Letters Patent, is:

A berry pail comprising a conical receptacle, a handle attached to the same and comprising a section of wire rebent to provide a depressed portion designed to fit beneath the wrist, said depressed portion having horizontal portions and depending shank portions parallel to said first named depressed portion, said shank portions being secured to the wall section of the pail, and connecting means between said horizontal portions to detachably connect the same to the wrist.

In testimony whereof, I affix my signature hereto.

WILLIAM S. JACOBSON.

Copies of this patent may be obtained for five cents each, by addressing the "Commissioner of Patents, Washington, D. C."